United States Patent

[11] 3,564,255

[72] Inventor George Robert Massey
     Long Beach, Calif.
[21] Appl. No. 641,320
[22] Filed May 25, 1967
[45] Patented Feb. 16, 1971
[73] Assignee Chevron Research Company
     San Francisco, Calif.

[54] RADIOACTIVE SOURCE CAPSULE-HANDLING SYSTEM
     1 Claim, 3 Drawing Figs.
[52] U.S. Cl. ................................................. 250/106;
                                                  250/108; 250/222
[51] Int. Cl. ................................................ G21f 5/00
[50] Field of Search .................................... 250/106
                                                   (S), 108, 222

[56] References Cited
     UNITED STATES PATENTS
     2,965,761  12/1960  Horvath ..................... 250/106S
     3,102,958   9/1963  King .......................... 250/106S
     3,123,713   3/1964  Maud et al. ................. 250/106S Primary Examiner—Archie R. Borchelt
Attorneys—A. L. Snow, F. E. Johnston, R. L. Freeland, Jr., C. J. Gibeau and E. J. Keeling ABSTRACT: The invention is particularly directed to a capture and sensing system useful in pneumatic transportation of capsules.

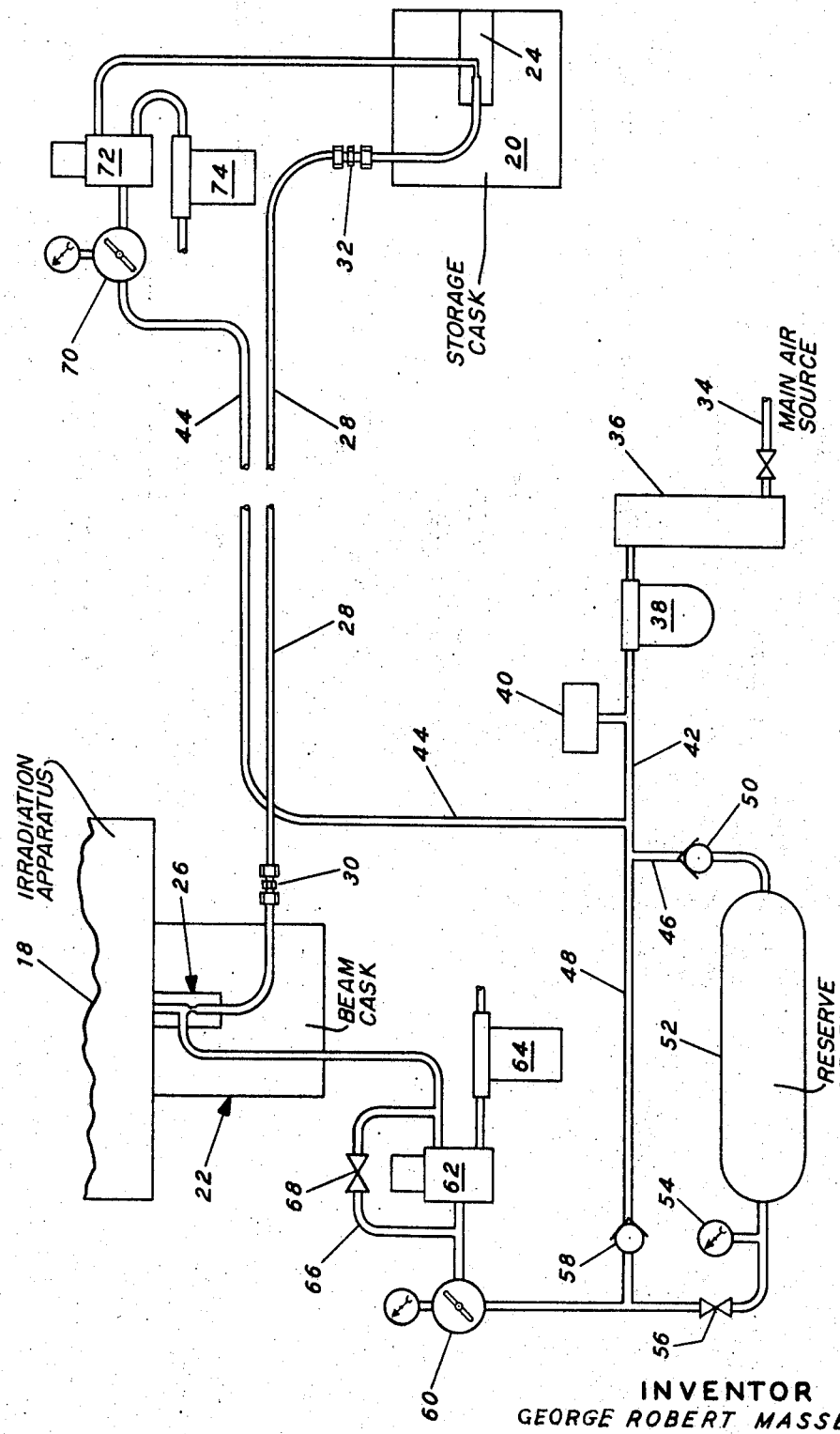

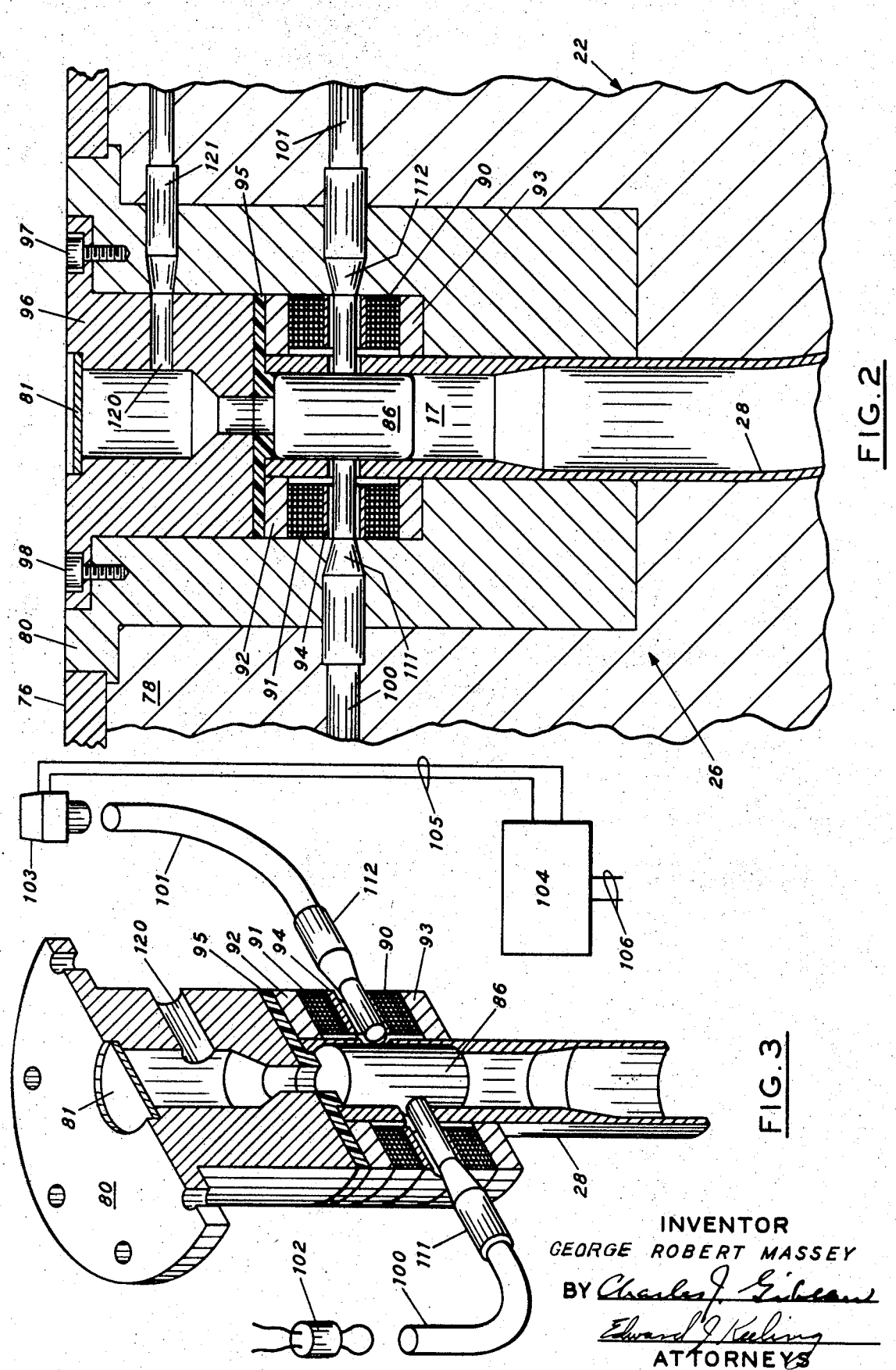

RADIOACTIVE SOURCE CAPSULE-HANDLING SYSTEM

This invention relates to a transportation system for use in moving objects between locations and more particularly, the invention relates to a capture and sensing system for a transportation system useful to transport radioactive source capsules between a storage location and a use location.

An area in which a pneumatic transport system is particularly useful is the transfer of a radioactive source between a safe storage location and a location in which the source is to be used. The storage location is usually termed a storage cask and the use location is called a beam cask. Heretofore systems have been used to transport radioactive source capsules between a storage cask and a beam cask. However, certain problems, particularly in the capturing and sensing of the radioactive capsule in the cask, have yet to be overcome by existing systems. Since by the nature of the capsule, i.e., highly radioactive, the transport, capture and sensing must be done entirely remote from direct human participation. It is therefore especially important to provide for sure capture and sensing of the radioactive source capsule.

In a broad aspect, the present invention provides a capsule transport system wherein a capsule is transported from a first location to a second location through an elongated tube means. Pneumatic means are used to move the capsule through the tube from the first location to the second location. Capture means are connected to the tube means at the second location. The capture means includes a capture housing adapted to receive the capsule in a central opening through at least a portion of its length. Magnetic means are used to retain the capsule in the central opening of the capture means housing. Sensing means are provided for sensing the presence of the capsule in the capsule capture chamber of the central opening of the capture means.

In a more particular aspect, the present invention includes a transport system for transporting a radioactive source capsule from a storage cask to a beam cask comprising an elongated tube means extending from a storage cask to a beam cask, pneumatic means for selectively moving the source capsule through said elongated tube means, capture means connected to said elongated tube means, said capture means including a capture means housing having a central opening through at least a portion of its length for receiving said source capsule, shoulder means in a capture means housing and partially closing said central opening for stopping said source capsule, magnetic means for retaining said source capsule in said capture means housing adjacent said shoulder means and sensing means for sensing the presence of said capsule in the central opening of said capture means housing.

It is a particular object of the present invention to provide a pneumatic transport system including an improved capture means and sensing means for transporting a capsule from a storage cask to a beam cask.

Further objects and advantages of this invention will become apparent from the following detailed description read in light of the accompanying drawings which are made a part of this specification and in which:

FIG. 1 is a schematic diagram of a capsule transport system assembled in accordance with the invention;

FIG. 2 is a sectional view and illustrates the preferred capsule capture and sensing system assembled in accordance with the present invention; and FIG. 3 is an isometric view, with parts cut away for clarity of presentation, and illustrates the preferred embodiment of the capture and sensing system assembled in accordance with the present invention.

With reference now to the drawings and to FIG. 1 in particular, the transport system, assembled in accordance with the present invention, is shown. The automatic transport system is useful, for example, to transport a radioactive source capsule from a storage location such as storage cask 20 to a use location such as beam cask 22. The use might be to irradiate an object in apparatus generally designated by the number 18. A transport system, when used to move radioactive source capsules, is generally located in an inaccessible place for safety purposes. Thus, these systems are usually buried underground. Therefore, the systems must be highly reliable and in particular the capture and sensing portions of the system must operate effectively.

Both the storage cask 20 and the beam cask 22 have capture means, indicated generally at 24 and 26 respectively, for holding a capsule in a predetermined location. The storage cask 20 and the beam cask 22 are heavily lead shielded to prevent stray radiation from doing damage. An elongated transport tube means 28 connects the capture means 24 and 26 and provides a path for transporting the capsule between the casks 20 and 22. Suitable connecting joints 30 and 32 may be used in the transport tube.

The source capsule is selectively moved between the capture devices 24 and 26 by means of air pressure injected into the blank end of the respective capture means. Compressed air from an air source 34 is passed through a water separator 36 and an air filter 38 to remove foreign materials from the air before it enters the system. A pressure switch 40 monitors the pressure at this point in the system. The pressure switch 40 is part of the overall safety circuit and actuates an alarm and deactivates the equipment if air pressure is not available.

Downstream of the pressure switch 40 the air line 42 splits into three lines 44, 46 and 48. Branch line 46 flows air through a check valve 50 into a reserve storage tank 52. The reserve tank 52 provides a reserve supply of air sufficient to return the source capsule to the storage cask 20 in the event of air supply failure while the capsule is in the beam cask. The pressure in the reserve storage tank 52 is monitored by means of pressure indicator 54. A manually operated valve 56 can direct the air from storage tank 52 only to a position for returning the source capsule to the storage cask 20 in the event of an emergency.

Branch lines 44 and 48 respectively are used to direct air for capsule transport. Branch line 48, for example, directs air to a position for moving the capsule from beam cask 22 to storage cask 20. Air is directed through check valve 58 to pressure regulator 60. The pressure regulator 60 supplies air to solenoid valve 62 from where it is directed to a position for transporting the source capsule from the beam cask 22 to the storage cask 20. Excess air from this portion of the transport system passes through the exhaust ports of the solenoid valve 62 and is exhausted to atmosphere through microfilters 64. The solenoid valve can be bypassed by means of line 66 and manually operated valve 68 in the event that an emergency requires return of the capsule to storage.

The air system for moving the capsule from the storage cask 20 to the beam cask 22 includes a pressure regulator 70 useful to supply air to a solenoid valve 72. Air is passed on command through the solenoid valve 72 to the storage cask 20 for use in moving the capsule. The extra air from the solenoid valve 72 is exhausted to atmosphere through microfilter 74. Suitable electric controls for the equipment are wired to a central control board 104 for use in controlling the operation of the system.

FIG. 2 is a sectional view and FIG. 3 is an isometric view with parts cut away for clarity of presentation showing the preferred embodiment of capture means and sensing means assembled in accordance with the present invention. In FIG. 2 a portion of a beam cask is indicated generally by the number 22. The cask when used with a radioactive source capsule is formed of steel plates 76 filled with shielding lead 78. A beam window 81 allows radiation to be emitted at a selected location.

The elongated tube means 28 enters the beam cask at an appropriate location and terminates in a capture means indicated generally by the numeral 26. The tube means 28 is reduced in diameter to about the diameter of the capsule to form capsule capture chamber 17. A capture means housing 80 has a central opening through at least a portion of its length. The elongated tube means 28 terminates in the lower portion of the capture means housing 80 and is adapted to direct the capsule into the capture means housing 80. Magnet means comprising two axially aligned permanent ceramic magnets 90 and 91 with soft steel pole pieces 92 and 93 are housed in the capture means housing 80 at a suitable location to hold capsule 86 in a predetermined location in the housing 80. A steel spacer 94 is located between the magnets. The magnetic means cooperate within the capture means housing 80 to provide an opening to receive the capsule and the end of the elongated tubular means 28. The magnets are permanent magnets and produce a magnetic field suitable to retain the capsule in the capture means housing until air pressure is used to move the capsule to another cask.

Means to stop the capsule in the capture means housing 80 are provided. For example, shoulder means 95 is located inside the housing 80. The shoulder means 95 cooperates to form a portion of the central opening passing through the housing; however, it reduces the opening to a size through which the capsule cannot pass. The shoulder means thus stops the capsule and the magnetic means holds it in place. The shoulder means is preferably formed of a tough material such as Teflon. The shoulder means 95 is held in place by air chamber housing 96 which in turn in connected to the capture means housing by bolts 97 and 98.

The air chamber housing 96 forms a closed air chamber upstream of the capsule capture location. The air chamber thus terminates the central opening of the capture means. The air chamber housing is provided with an opening 120 for an air line 121 so that air pressure may be utilized to move a capsule out of the capture means of one cask and back to the other cask.

It is important to know the location of the capsule in the system. Thus the presence or absence of the capsule in the capture means must be known. An optical sensing means is provided to sense the presence or absence of the capsule in the capture means. The metal spacer 94 which separates magnets 90 and 91 is drilled to receive the metal ferrules 111 and 112 on the ends of the pair of optic light pipes 100 and 101. These light pipes are opposingly arranged at opposite sides of the capsule capture chamber 17 so that a light directed through one of the light pipes is visible out the other end of the other pipe. A light source 102 directs light into one of the light pipes 100 and a light-sensing means 103 at the end of the other light pipe 101 is sensitive to such light. The presence or absence of capsule 86 is thus detected, respectively, by the absence or presence of light sensed by means 103. This information is relayed to a control panel 104 by suitable electrical connections 105. The central control panel 104 may also be utilized to send signals to the solenoid valve by means of electrical connections 106.

As indicated above, when the source capsule 86 is in either the storage cask 20 or the beam cask 22, it interrupts a beam of light passing through light pipes 100 and 101 and triggers suitable electronic circuitry to indicate the position of the capsule on control panel 104. When a request for transporting the source capsule from the storage cask 20 to the beam cask 22 is initiated, the solenoid valve 72 is operated and compressed air transports the source capsule through elongated transport tube means 28 to the capture means of the beam cask 22. When the capsule leaves its capture position in the storage cask, the light beam is sensed and a source in transport signal light is flashed at the control panel 104. When the source reaches the beam cask 22 and is captured in the capture means 26, it breaks the light beam between the light pipes 100 and 101 and a signal is indicated on control panel 104.

It is apparent that modifications other than those described herein may be made to the apparatus of this invention without departing from the invention concept. It is intended that the invention embrace all the equivalents within the scope of the appended claims.

I claim:

1. A transport system for transporting a radioactive source capsule from a storage cask to a beam cask comprising an elongated tube means extending from a storage cask to a beam cask, pneumatic means for selectively moving the source capsule through said elongated tube means, capture means connected to said elongated tube means, said capture means including a housing member having a central opening through at least a portion of its length for receiving said source capsule, shoulder means on said housing member for stopping said source capsule at a predetermined location therein, permanent magnetic means for retaining said source capsule in said housing member of said capsule means adjacent said shoulder means, means arranged on opposite sides of said housing member for directing an interruptable beam of light across said central opening, and sensing means responsive to interruption of said beam of light for sensing the presence of said capsule in the central opening of said housing member of said capture means.